(12) United States Patent
Nakano et al.

(10) Patent No.: US 6,461,271 B2
(45) Date of Patent: Oct. 8, 2002

(54) BELT-TYPE CONTINUOUSLY VARIABLE TRANSMISSION

(75) Inventors: Shigeji Nakano; Junji Urano; Yoichi Sato, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 13 days.

(21) Appl. No.: 09/814,101

(22) Filed: Mar. 22, 2001

(65) Prior Publication Data

US 2001/0027143 A1 Oct. 4, 2001

(30) Foreign Application Priority Data

Mar. 27, 2000 (JP) ........................................ 2000-086617

(51) Int. Cl.$^7$ .............................................. B60K 41/12
(52) U.S. Cl. .............................. 477/39; 474/18; 474/28; 477/45
(58) Field of Search ........................ 474/28, 18; 477/39, 477/45, 48

(56) References Cited

U.S. PATENT DOCUMENTS

| | | | | | |
|---|---|---|---|---|---|
| 4,433,594 A | * | 2/1984 | Smirl | .................... | 192/113.34 |
| 4,606,446 A | * | 8/1986 | Watanabe | ................ | 192/103 R |
| 5,098,345 A | * | 3/1992 | Van Vuuren | ................... | 474/11 |
| 5,720,692 A | * | 2/1998 | Kashiwabara | ................. | 474/28 |
| 6,053,843 A | * | 4/2000 | Van Vuuren et al. | ........ | 477/109 |
| 6,146,294 A | * | 11/2000 | Bolz | ............................ | 474/70 |
| 6,168,546 B1 | * | 1/2001 | Loffler et al. | ................ | 477/109 |

FOREIGN PATENT DOCUMENTS

| JP | 61-51187 | 11/1986 |
|---|---|---|
| JP | 4-228960 | 8/1992 |

* cited by examiner

Primary Examiner—Christopher P. Schwartz
Assistant Examiner—Devon Kramer
(74) Attorney, Agent, or Firm—Armstrong Westerman & Hattori, LLP

(57) ABSTRACT

A first side-pressure, that is supplied to cylinder 74 of the drive pulley 71 or to cylinder 78 of the driven pulley 75 as pressure determining the transmission torque capacity of continuously variable transmission mechanism 70, is supplied to a frictional engagement element, where it is used as the working hydraulic fluid pressure. The transmission torque capacity of the frictional engagement element is set to be somewhat lower than the transmission torque capacity of the continuously variable transmission mechanism.

5 Claims, 7 Drawing Sheets

| | FIRST SOLENOID VALVE | SECOND SOLENOID VALVE | LOCK-UP MECHANISM ENGAGEMENT CONTROL | FRICTIONAL ENGAGEMENT ELEMENT CAPACITY CONTROL | LINE PRESSURE |
|---|---|---|---|---|---|
| (1) | OFF | OFF | IMPOSSIBLE (DISENGAGED) | POSSIBLE BY MEANS OF CONTROL PRESSURE FROM L/S | HIGH PRESSURE |
| (2) | ON | OFF | POSSIBLE | POSSIBLE BY MEANS OF FIRST SIDE-PRESSURE | LOW PRESSURE |
| (3) | ON | ON | POSSIBLE | POSSIBLE BY MEANS OF CONTROL PRESSURE FROM L/S | LOW PRESSURE |
| (4) | OFF | ON | POSSIBLE | POSSIBLE BY MEANS OF CONTROL PRESSURE FROM L/S | HIGH PRESSURE |

L/S: LINEAR SOLENOID VALVE

Fig. 7

| | FIRST SOLENOID VALVE | SECOND SOLENOID VALVE | LOCK-UP MECHANISM ENGAGEMENT CONTROL | FRICTIONAL ENGAGEMENT ELEMENT CAPACITY CONTROL | WORKING HYDRAULIC FLUID SUPPLY CAPACITY |
|---|---|---|---|---|---|
| (1) | OFF | OFF | IMPOSSIBLE (DISENGAGED) | POSSIBLE BY MEANS OF CONTROL PRESSURE FROM L/S | LARGE |
| (2) | ON | OFF | POSSIBLE | POSSIBLE BY MEANS OF FIRST SIDE-PRESSURE | SMALL |
| (3) | ON | ON | POSSIBLE | POSSIBLE BY MEANS OF CONTROL PRESSURE FROM L/S | SMALL |
| (4) | OFF | ON | POSSIBLE | POSSIBLE BY MEANS OF CONTROL PRESSURE FROM L/S | LARGE |

L/S: LINEAR SOLENOID VALVE

BELT-TYPE CONTINUOUSLY VARIABLE TRANSMISSION

FIELD OF THE INVENTION

The present invention relates to a belt-type continuously variable transmission comprising a continuously variable transmission mechanism in which a belt passes over a drive pulley and a driven pulley, a frictional engagement element that interrupts drive from the engine, and means that control the side-pressure that is supplied to the cylinder chambers of the two pulleys.

BACKGROUND OF THE INVENTION

A belt-type continuously variable transmission of this type is arranged such that the drive from an engine is transmitted through a continuously variable transmission mechanism comprising a drive pulley, driven pulley and a belt that passes over these two pulleys, and a frictional engagement element that interrupts drive of the engine; such a belt-type continuously variable transmission is employed in vehicles etc. In such a belt-type continuously variable transmission, if the transmission torque of the belt exceeds an allowed value (the torque such that, if the transmission torque of the belt rises above this, the belt slips), the belt slips, which is undesirable from the point of view of both friction and costs. In order to prevent this situation, the technique of setting a maximum torque lower than the aforementioned allowed value by means of a frictional engagement element has become publicly known by Laid-open Japanese Patent publication number H. 4-228960 etc; with this technique, if the transmission torque of the belt rises, the frictional engagement element starts to slip before the torque exceeds the aforementioned allowed value, so there is no possibility of the transmission torque of the belt exceeding this allowed value. It is desirable that the transmission torque of this frictional engagement element should be a value that is as close as possible to the aforementioned allowed value, but, since the allowed value constantly changes in response to the pulley force (side-pressure) with which the belt is gripped, usually the transmission torque of the frictional engagement element is electronically controlled by means of a linear solenoid valve etc.

However, in such a construction in which transmission torque control of the frictional engagement element is performed using a linear solenoid valve, the linear solenoid valve is expensive, giving rise to the problem of high manufacturing costs.

SUMMARY OF THE INVENTION

An object of the present invention is to provide a belt-type continuously variable transmission of a construction that is capable of preventing belt slippage by means of a straightforward construction that does not employ a linear solenoid valve.

A belt-type continuously variable transmission according to the present invention comprises: a continuously variable transmission mechanism wherein a belt passes over a drive pulley connected with an input shaft (for example input shaft 20 in the embodiments) that inputs drive from a motor (for example, an engine in the embodiments) and a driven pulley connected with an output shaft (for example, left and right axle shafts S4, S5 in the embodiments) and wherein gear-change action is performed by receiving supply of working hydraulic fluid to a drive cylinder for pulley width setting of the drive pulley and a driven cylinder for pulley width setting of the driven pulley; a frictional engagement element provided between the motor and the drive pulley or between the driven pulley and the output shaft and that performs transmission of the drive from the motor with an engagement capacity responsive to the working hydraulic fluid pressure that is supplied or that is capable of cutting off transmission of drive by release thereof and side-pressure supply means (for example, in the embodiment, hydraulic pump 100, regulator valve 110, first side-pressure control linear solenoid valve 120 and second side-pressure control linear solenoid valve 124) that supply a first side-pressure that determines the transmission torque capacity of the continuously variable transmission mechanism to one of the two cylinders and that supply a second side-pressure whereby gear-change action of the continuously variable transmission mechanism is performed to the other of the two cylinders; the first side-pressure being supplied to the frictional engagement element as the working hydraulic fluid pressure.

In a belt-type continuously variable transmission mechanism according to the present invention, the first side-pressure that determines the transmission capacity of the continuously variable transmission mechanism i.e. the torque that can be transmitted between the two pulleys without producing belt slippage is employed as the working hydraulic fluid pressure of the frictional engagement element, and the transmission torque capacity of the frictional engagement element is varied together with the transmission torque capacity of the continuously variable transmission mechanism. Consequently, if the transmission torque capacity of the frictional engagement element is set as required (for example, the first side-pressure is supplied to the frictional engagement element after being reduced in pressure, or the number of frictional plates constituting the frictional engagement element and/or their coefficient of friction are adjusted) so as to be somewhat lower than the transmission torque capacity of the continuously variable transmission mechanism, even if a torque exceeding the transmission torque capacity of the continuously variable transmission mechanism is input to the belt-type continuously variable transmission, slippage of the frictional engagement element can be induced before occurrence of belt slippage in the continuously variable transmission mechanism, thereby enabling damage to the belt due to slippage to be prevented. Also, with this construction, engagement capacity control of the frictional engagement element is performed without requiring an expensive linear solenoid valve, so manufacturing costs can be considerably reduced compared with the case where a linear solenoid valve is employed, and in regard to reliability with respect to belt slippage it is superior to a construction using a linear solenoid valve and is also of improved safety.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 5 is a diagram illustrating the relationship between the combination of signal pressure outputs from the first and second solenoid valves and the control and line pressure of the lock-up mechanism and the frictional engagement element according to a first embodiment;

FIG. 7 is a diagram illustrating the relationship between the combination of signal pressure outputs from the first and second solenoid valves and the control and working hydraulic fluid supply capacity of the lock-up mechanism and the frictional engagement element according to a second embodiment.

DESCRIPTION OF THE PREFERRED EMBODIMENTS

Figure 1:
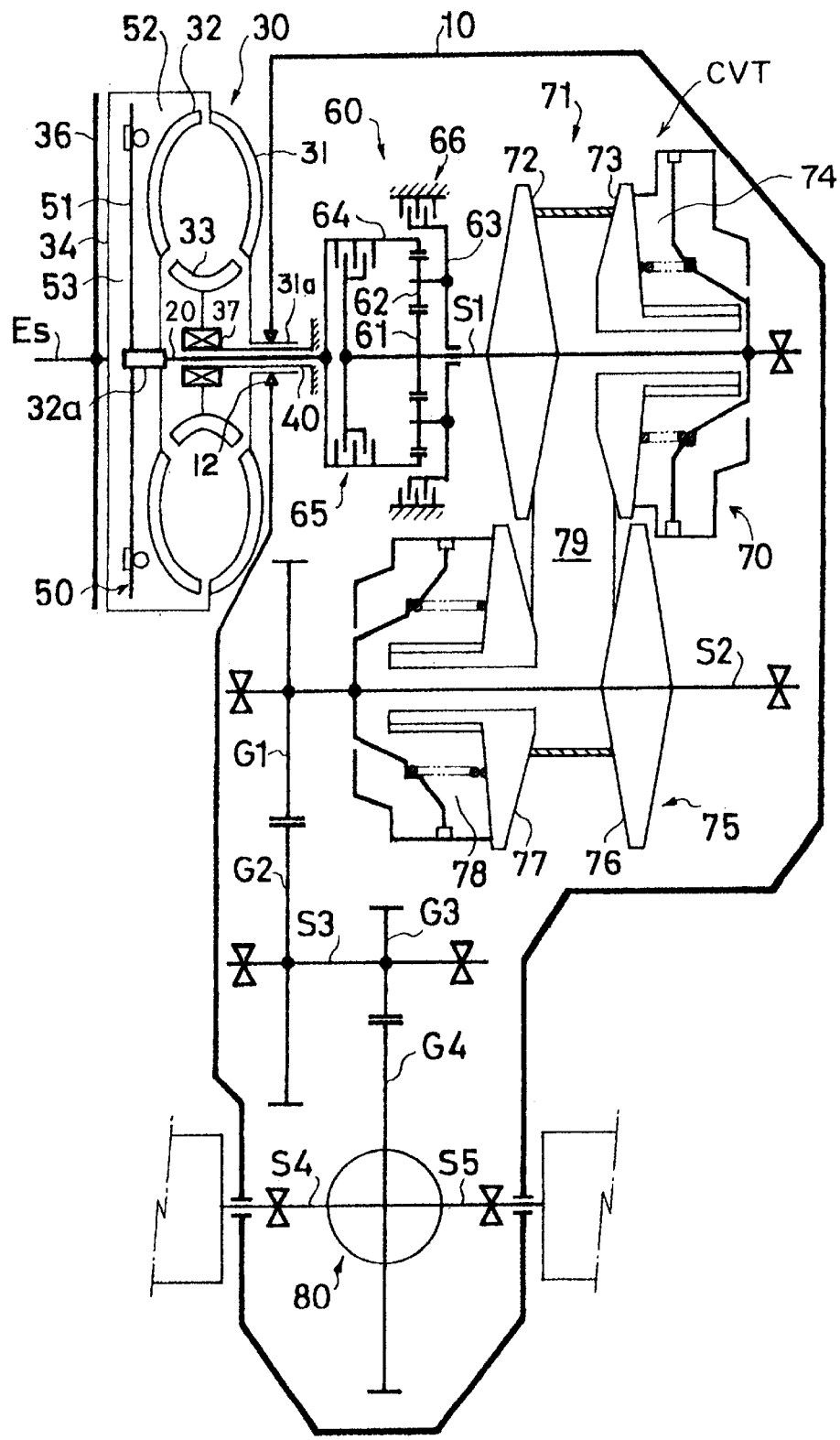
FIG. 1 is a skeleton view showing the construction of a drive transmission device for a vehicle to which a belt-type continuously variable transmission according to the present invention is applied.

Preferred embodiments of the present invention are described below with reference to the drawings. In the first embodiment which is here illustrated a belt-type continuously variable transmission according to the present invention is applied to a vehicle; FIG. 1 shows the skeleton of a vehicle drive transmission device including such a belt-type continuously variable transmission.

This vehicle drive transmission device is constructed comprising a belt-type continuously variable transmission CVT that outputs drive that is input from the engine (motor) with variable gear ratio, and a torque converter 30 that performs drive transmission and is provided between the engine and the belt-type continuously variable transmission CVT. The belt-type continuously variable transmission CVT is accommodated in a transmission case 10, input shaft 20, primary shaft S1, secondary shaft S2, counter shaft S3, and left and right axle shafts S4, S5 being respectively freely rotatably supported by bearings mounted in transmission case 10. Input shaft 20 and primary shaft S1 are provided coaxially, and secondary shaft S2 is arranged separated by a prescribed distance parallel with input shaft 20 (or primary shaft S1). Counter shaft S3 is arranged separated by a prescribed distance parallel with secondary shaft S2 and left and right axle shafts S4, S5 are provided coaxially and positioned separated by a prescribed distance parallel with counter shaft S3.

Drive from the engine, not shown, is input through torque converter 30 to input shaft 20. Torque converter 30 is constructed comprising a pump impeller 31, turbine runner 32 and stator 33; pump impeller 31 is unitary with converter cover 34 covering its periphery and is mounted on engine crankshaft Es by means of a drive plate 36 on which a starter gear is mounted. Turbine runner 32 is coupled with input shaft 20 through turbine runner hub 32a; stator 33 is mounted on a stator shaft 40 through one-way clutch 37. In addition, boss 31a of the pump impeller is freely rotatably supported by bearing 12.

A lock-up mechanism 50 is provided on torque converter 30; the arrangement is such that drive from the engine can be directly transmitted to input shaft 20 by engagement of the two members 51, 34 by pressing a lock-up clutch piston 51 that is mounted on turbine runner hub 32a onto the inside face of a converter cover 34. This operation of lock-up clutch piston 51 is performed by supplying/discharging hydraulic fluid to two hydraulic chambers formed by partitioning the interior space of torque converter 30 by means of lock-up clutch 51, namely, a hydraulic chamber (which will be designated as hydraulic chamber 52 on the turbine side) formed nearer to the turbine runner 32 than lock-up clutch 51 and a hydraulic chamber (which will be designated as hydraulic chamber 53 on the cover side) formed nearer to converter cover 34 than lock-up clutch piston 51.

Drive from input shaft 20 is transmitted to primary shaft S1 through forwards/reverse movement changeover mechanism 60. Forwards/reverse of movement changeover mechanism 60 is constituted comprising a sun gear 61 that is fixed to primary shaft S1, a plurality of pinion gears 62 that are in external contact with this sun gear 61, a carrier 63 that is freely rotatable with respect to primary shaft S1 and freely rotatably supports this plurality of pinion gears 62, and a ring gear 64 that is fixed to input shaft 20 and is in internal contact with this plurality of pinion gears 62. Primary shaft S1 and ring gear 64 are engageable by hydraulic actuation of forwards movement clutch 65; carrier 63 and transmission case 10 are engageable by hydraulic actuation of reverse movement brake 66.

When forwards movement clutch 65 is engaged and reverse movement brake 66 is released, input shaft 20, ring gear 64, pinion gear 62, sun gear 61 and carrier 63 rotate in unitary fashion, so primary shaft S1 rotates in the same direction as input shaft 20; when forwards movement clutch 65 is released and reverse movement brake 66 is engaged, the rotation of input shaft 20 is transmitted to sun gear 61 through pinion gears 62 whose rotary shafts are fixed by carrier 63, so primary shaft S1 rotates in the opposite direction to input shaft 20.

Drive of primary shaft S1 is transmitted to secondary shaft S2 through continuously variable transmission mechanism 70 constituted of drive pulley 71 provided on primary shaft S1, driven pulley 75 provided on secondary shaft S2 and belt (metal V-belt) 79 that passes over these two pulleys 71 and 75.

Drive pulley 71 is constituted of a fixed pulley half 72 that is fixed to primary shaft S1 and a moveable pulley half 73 that is provided facing this fixed pulley half 72 and freely slidable in the axial direction on primary shaft S1; the separation (pulley width) between fixed pulley half 72 and moveable pulley half 73 can be varied by shifting moveable pulley half 73 by supplying/discharging hydraulic fluid in respect of drive cylinder 74. Also, driven pulley 75 is constituted of fixed pulley half 76 that is fixed to secondary shaft S2 and moveable pulley half 77 that is provided facing this fixed pulley half 76 and freely slidable in the axial direction along secondary shaft S2; the separation (pulley width) between fixed pulley half 76 and moveable pulley half 77 can be varied by shifting moveable pulley half 77 by supplying/discharging hydraulic fluid in respect of driven cylinder 78. Thus the radius with which belt 79 is wound thereon can be altered by adjusting the pulley width of these two pulleys 71, 75 and the gear ratio between the two shafts S1, S2 can thereby be varied in continuous fashion.

The drive that is input to secondary shaft S2 is transmitted through gear G1 and gear G2 to counter shaft S3 and is further transmitted to differential mechanism 80 through final drive gear G3 and final driven gear G4. The drive that is input in differential mechanism 80 is apportioned and transmitted to the left and right front axle shafts S4, S5, thereby driving the left and right wheels (front wheels), not shown, provided at the respective ends of these two shafts S4 and S5. In this way, with such a vehicle drive transmission device, the engine drive that is input to input shaft 20 through torque converter 30 is transmitted to the left and right front wheels through forwards/reverse movement changeover mechanism 60 and continuously variable transmission mechanism 70; vehicle running can thereby be performed and a gear ratio which can be altered at will can be obtained in continuously variable fashion by operating continuously variable transmission mechanism 70 as described above. It should be noted that changeover of the direction of vehicle running is performed by operating forwards/reverse movement changeover mechanism 60.

Figure 2:
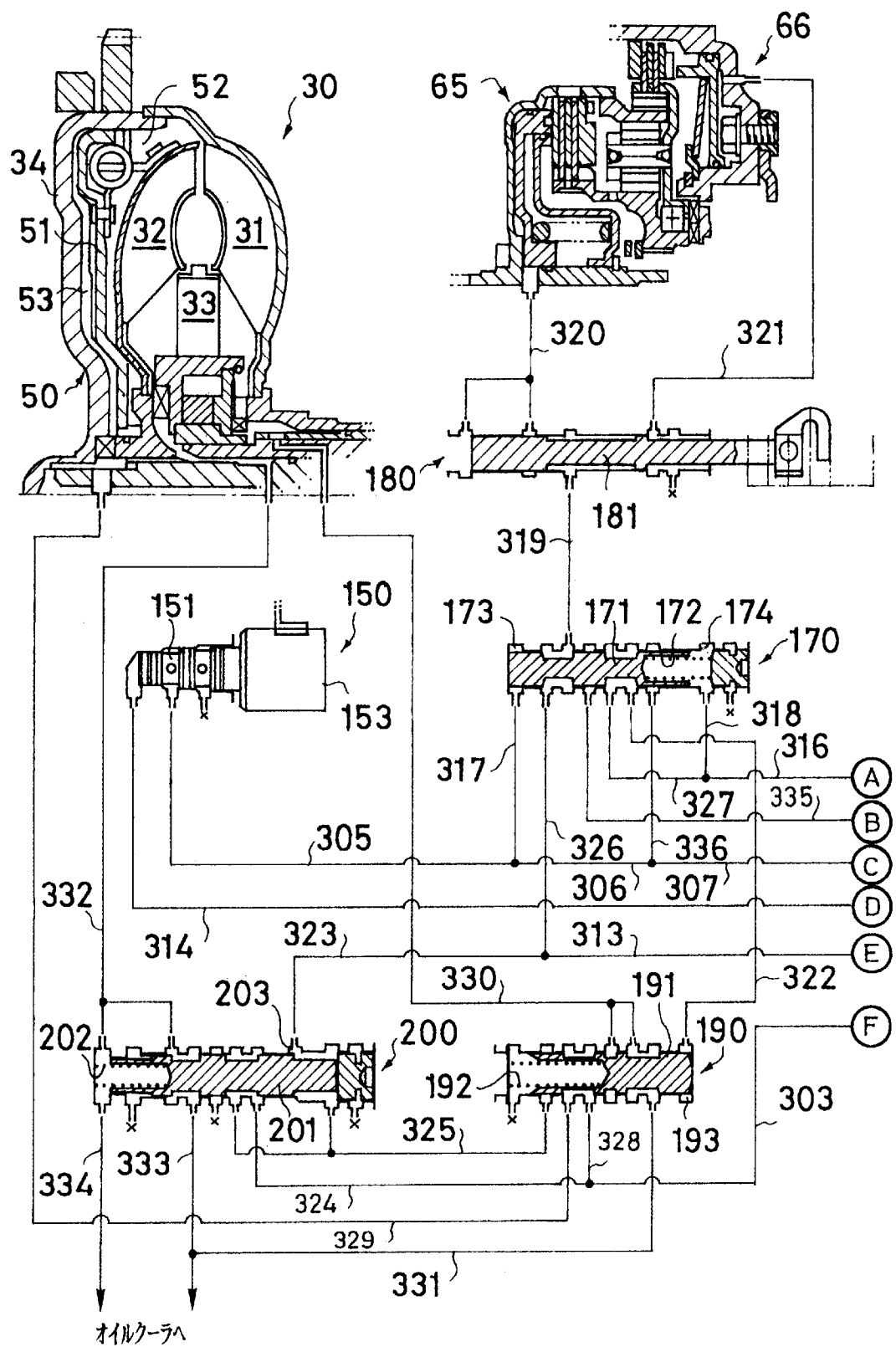
FIG. 2 is a hydraulic circuit diagram illustrating the construction of the above drive transmission device for a vehicle.
Figure 3:
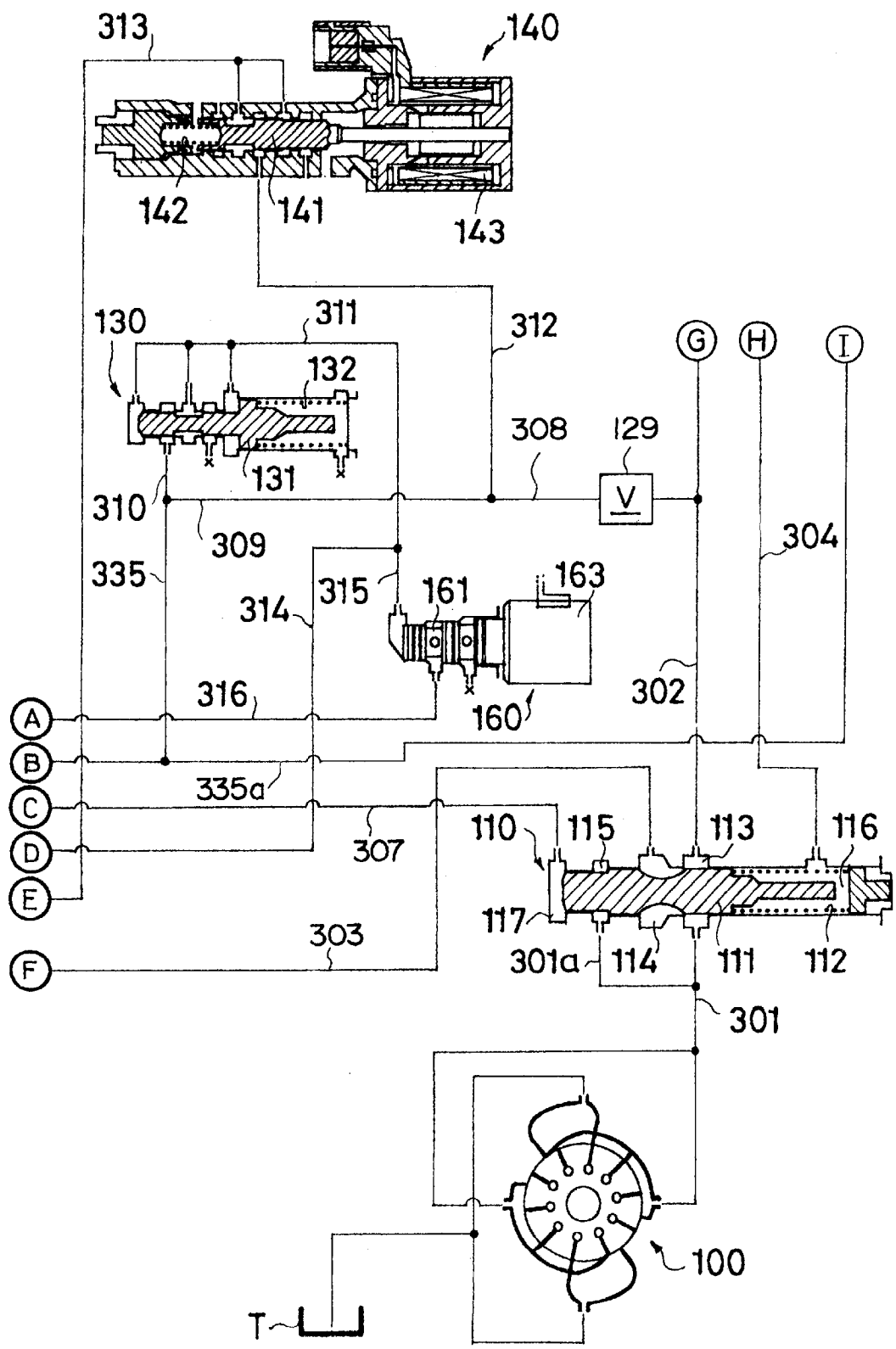
FIG. 3 is a hydraulic circuit diagram illustrating the construction of the above drive transmission device for a vehicle.
Figure 4:
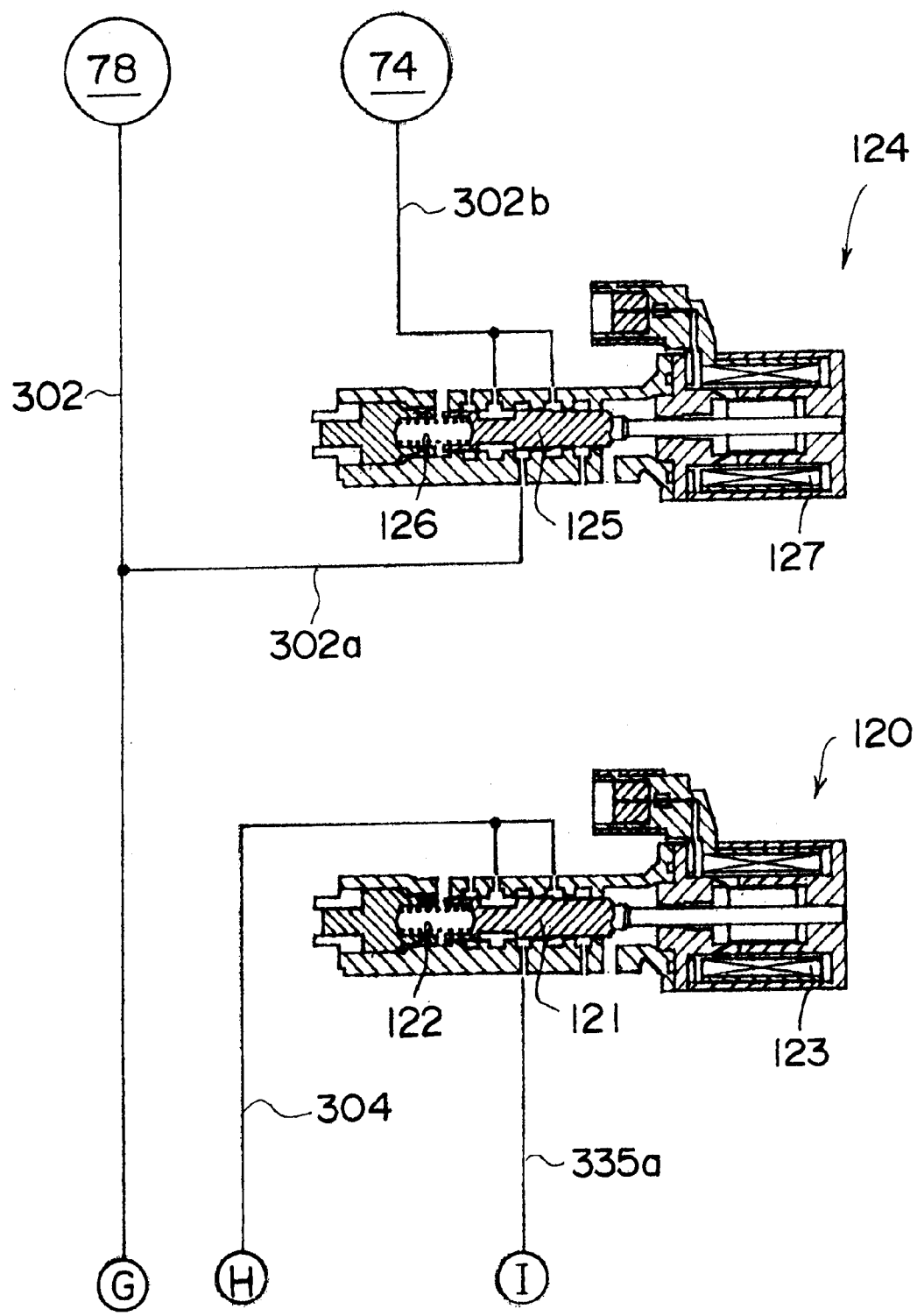
FIG. 4 is a hydraulic circuit diagram illustrating the construction of the above drive transmission device for a vehicle.

FIG. 2 to FIG. 4 are hydraulic circuit diagrams illustrating part of the construction of this vehicle drive transmission device. In these two Figures, the letters A to F and the letters G to I surrounded by circles indicate mutually connected hydraulic paths.

Apart from torque converter 30, drive pulley 71, driven pulley 75, forward movement clutch 65, and reverse movement brake 66 mentioned above, this drive transmission device is constituted comprising hydraulic pump 100, regulator valve 110, first side-pressure control linear solenoid valve 120 and a second side-pressure control linear solenoid valve 124, reducing valve 129, modulator valve 130, linear solenoid valve 140, first solenoid valve 150, second solenoid valve 160, clutch shift valve 170, manual valve 180, lock-up shift valve 190, lock-up control valve 200 and an electrical control unit (not shown) etc. Operating control of first side-pressure control linear solenoid valve 120, the second side-pressure control linear solenoid valve 124, linear solenoid valve 140, first solenoid valve 150 and second solenoid valve 160 is performed by the electrical control unit in accordance with information such as engine speed, degree of throttle opening, vehicle speed, and temperature of the working hydraulic fluid detected by sensors, not shown.

Hydraulic pump 100 sucks working fluid from hydraulic fluid tank T and discharges and supplies this into hydraulic fluid path 301 that is communicated with regulator valve 110. In FIG. 3 a vane pump is shown as an example of hydraulic pump 100, but it need not necessarily be a vane pump.

Regulator valve 110 is constituted comprising a spool 111 that is capable of being shifted to left And right within the housing and a spring 112 that constantly biases spool 111 to the left, being provided to the right of this spool 111. In the vicinity of the center of this regulator valve 110, there is provided a hydraulic chamber 113, this hydraulic chamber 113 being connected to the aforementioned hydraulic fluid path 301 that is communicated with hydraulic pressure pump 100 and hydraulic fluid path 302 that is communicated with driven cylinder 78. The working hydraulic fluid that is discharged from hydraulic pump 100 therefore flows through hydraulic chamber 113 into driven cylinder 78; the working hydraulic fluid within hydraulic fluid path 301 applies a biasing force in the rightwards direction to spool 111 by entering hydraulic chamber 115 from this branch hydraulic fluid path 301a, so hydraulic chamber 113 and hydraulic chamber 114 are put in communication, with spool 111 being in a position at which this biasing force in the rightwards direction and the biasing force in the leftwards direction produced by spring 112 are in balance; some of the working hydraulic fluid within hydraulic chamber 113 is discharged from hydraulic fluid path 303 as excess hydraulic fluid. The pressure within hydraulic fluid path 302 is thereby regulated to a prescribed pressure (line pressure). The excess hydraulic fluid that is discharged from hydraulic fluid path 303 is supplied to torque converter 30, as will be described, or is employed as lubricating fluid for the various parts of the belt-type continuously variable transmission CVT.

The spring chamber of 116 of regulator valve 110 is communicated through hydraulic fluid path 304 with first side-pressure control linear solenoid valve 120. This first side-pressure control linear solenoid valve 120 comprises a spool 121 that is moveable to left and right within the case, a spring 122 that biases spool 121 constantly in the rightwards direction and is provided on the left-hand side of this spool 121, and a solenoid 123 that is provided on the right-hand side of spool 121. This spool 121 is arranged to move leftwardly by an amount responsive to the attractive force of solenoid 123 that is controlled by the electrical control unit; an adjusted pressure is thereby generated by adjusting a secondary pressure of the line pressure (a pressure obtained by reducing the line pressure by reducing valve 129) supplied through hydraulic fluid path 308 (provided with reducing valve 129 at some point along its path), 309, 335, and 335a, which are branched paths of hydraulic fluid path 302; this can thereby be supplied into hydraulic fluid path 304. This adjusted pressure is set to a magnitude corresponding for example to the degree of throttle opening; thus the line pressure can be raised by raising the regulator-adjusted pressure by generating additional leftwards biasing force onto spool 111. Typically, the line pressure is set to be raised when the degree of opening of the accelerator is larger, such as when the vehicle is accelerating or climbing a hill.

Also, the hydraulic chamber 117 that is formed to the left of spool 111 is communicated through hydraulic fluid paths 305, 306, 307 with first solenoid valve 150, so that, by the action of a first signal pressure (to be described later) that is output by operation of first solenoid valve 150 in response to an instruction from the electrical control unit, rightward biasing force is applied to spool 111, enabling the line pressure to be thereby set to a lower level than normally. Hereinbelow, the ordinary level line pressure that is set in the condition where the first signal pressure does not act in hydraulic chamber 117 is called "high-pressure line pressure" and the position (left-hand position) of spool 111 under these circumstances is called "position corresponding to high pressure"; and the line pressure of lower level than normal that is set in the condition where the first signal pressure acts in hydraulic chamber 117 is called "low-pressure line pressure" and the position (right-hand position) of spool 111 under these circumstances is termed the "position corresponding to low pressure".

Second side-pressure control linear solenoid valve 124 comprises a spool 125 that is capable of being moved to left and right within the case, a spring 126 that normally biases spool 125 in the rightwards direction, being provided on the left of this spool 125, and a solenoid 127 that is provided on the right of spool 125. This spool 125 is moved to the left by an amount corresponding to the attractive force of solenoid 127 controlled from the electrical control unit in accordance with for example the degree of opening of the throttle; it thereby adjusts the line pressure that is supplied through hydraulic fluid path 302a, which is a branch path of hydraulic fluid path 302.

The pressure (i.e. line pressure) that is obtained by pressure adjustment by regulator valve 110 and first side-pressure control linear solenoid valve 120 of the discharge pressure from hydraulic pump 100 is supplied to driven cylinder 78 as a pressure that determines the transmission torque capacity of continuously variable transmission mechanism 70 i.e. the torque that is capable of being transmitted between the two pulleys 71, 75 without generating slippage at belt 79. Hereinbelow, this pressure that is supplied to the driven cylinder 78 will be called the "first side-pressure". Also, the pressure obtained by reducing their first side-pressure by the second side-pressure control valve 124 is supplied to drive cylinder 74 as a pressure that executes a gear ratio change action of continuously variable transmission mechanism 70 i.e. that changes the pulley width of drive pulley 71. Hereinbelow, the pressure that is supplied to this drive cylinder 74 will be called the second side-pressure. It should be noted that the pulley width of the driven pulley 75 is also changed in accordance with change of the pulley width of this drive pulley 71.

In this way, the action of change of gear ratio of the continuously variable transmission mechanism 70 is performed by changing the winding radius of belt 79 by changing the pulley width of drive pulley 71 (the pulley width of driven pulley 75 is changed in accordance with change of the pulley width of the drive pulley 71) by changing the second side-pressure that is supplied to drive pulley 71 whilst constantly supplying the first side-pressure to driven pulley 75. The action of change of gear ratio of continuously variable transmission mechanism 70 can therefore be achieved by electromagnetically operated control of the first and second side-pressure control linear solenoid valves 120, 124. Since the second side-pressure is obtained by reducing the pressure of the first side-pressure, the first side-pressure supplied to driven cylinder 78 and the second side-pressure supplied to drive cylinder 71 are in a relationship "first side-pressure> second side-pressure"; however, since, as mentioned above, the pressure receiving area of drive cylinder 74 is larger than the pressure receiving area of driven cylinder 78, a gear ratio change action can be freely performed by making the pressing force of the drive cylinder 71 (i.e. the force that applies pressure in a direction such as to reduce the pulley width) greater than that of the driven pulley 74.

Modulator valve 130 comprises a spool 131 that is capable of movement in the left and right directions within the housing and a spring 132 that constantly biases spool 131 in the leftwards direction, being provided to the right of this spool 131. This modulator valve 130 supplies into hydraulic fluid path 311 modulator pressure obtained by adjusting a secondary pressure of the line pressure supplied through hydraulic fluid paths 302, 308 (provided with a reducing valve 129 at some point along its path), 309, 310, but, apart from the biasing force in the leftwards direction produced by spring 132, there also acts on spool 131 a biasing force in the rightwards direction generated by the action of the pressure within hydraulic fluid path 311 as back pressure, so the modulator pressure is adjusted to a value that balances the biasing pressure produced by spring 132.

Linear solenoid valve 140 comprises a spool 141 that is capable of being moved to left and right within the case, a spring 142 that constantly biases spool 141 leftwards, being provided on the left-hand side of this spool 141, and a solenoid 143 provided on the right-hand side of spool 141. This spool 141 is moved to the left by an amount corresponding to the attractive force of solenoid 143, which is controlled from the electrical control unit, so that a control pressure is generated by adjusting the pressure of the line pressure supplied through hydraulic fluid paths 302, 308, 312, this control pressure being supplied into hydraulic fluid path 313.

First solenoid valve 150 comprises a spool 151 that is capable of being moved to left and right within the housing, a spring (not shown) that constantly biases this spool 151 to the left, and a solenoid 153 provided on the right-hand side of spool 151. This spool 151 is moved to the right in response to generation of attractive force in solenoid 153 controlled by the electrical control unit, so that the branch hydraulic fluid path 314 and hydraulic fluid path 305 of hydraulic fluid path 311 constituting the flow path of the modulator pressure are then put in communication, allowing the modulator pressure to be output as the first signal pressure referred to above into hydraulic fluid path 305. Hereinbelow, the condition in which spool 151 is not moved to the right by the electrical control unit but is positioned on the left is called the "OFF" condition of the first solenoid valve 150, and the condition in which spool 151 is moved to the right by the electrical control unit is called the "ON" condition of the first solenoid valve 150.

Second solenoid valve 160 comprises a spool 161 that is capable of being moved to left and right within the housing, a spring (not shown) that constantly biases this spool 161 to the left, and a solenoid 163 provided on the right-hand side of spool 161. This spool 161 is moved to the right in response to generation of attractive force in solenoid 163 controlled from the electrical control unit and thereupon puts the branch hydraulic fluid path 315 and hydraulic fluid path 316 of hydraulic fluid path 311, constituting the flow path of modulator pressure, in communication, allowing the modulator pressure to be output as the second signal pressure into hydraulic fluid path 316. Hereinbelow, the condition in which spool 161 is not moved to the right by the electrical control unit but is positioned on the left-hand side is called the "OFF" condition of the second solenoid valve 160, and the condition in which spool 161 is moved to the right by the electrical control unit is called the "ON" condition of second solenoid valve 160.

Clutch shift valve 170 comprises a spool 171 capable of being moved to left and right within the housing, and a spring 172 that constantly biases spool 171 to the left and is provided on the right-hand side of this spool 171. On the left-hand side of spool 171, there is provided a hydraulic chamber 173 that is communicated with branch hydraulic fluid path 317 of hydraulic fluid path 305, which is the flow path of the first signal pressure; biasing force in the rightwards direction can be applied to spool 171 by the action of this first signal pressure. Also, on the right-hand side of spool 171, there is provided a hydraulic chamber 174 that is communicated with branch hydraulic fluid path 318 of hydraulic fluid path 316 constituting the flow path of the second signal pressure; biasing force in the leftwards direction can be applied to spool 171 by the action of this second signal pressure. When no signal pressure acts on both hydraulic chambers 173, 174, spool 171 is positioned on the left-hand side by the biasing force of spring 172, but, when, from this condition, the first signal pressure acts on hydraulic chamber 173, the biasing force produced by this first signal pressure overcomes the biasing force of spring 172, causing spool 171 to be positioned on the right-hand side; thus, when the second signal pressure acts on hydraulic chamber 174, irrespective of the first signal pressure acting on hydraulic fluid chamber 173, spool 171 is positioned on the left-hand side.

Manual valve 180 comprises a spool 181 that is moveable in the left and right direction within the housing. This spool 181 is capable of changeover of position such as N, D, R etc by being moved in the left and right direction by manual operation of a manual shift lever (not shown) provided at the driver's seat; in this way, engagement operation of clutch 65 and brake 66 can be effected by supply of working hydraulic fluid within hydraulic fluid path 319 supplied through clutch shift valve 170 in position D from hydraulic fluid path 320 to forward movement clutch 65 or, in position R, from hydraulic fluid path 321 to reverse movement brake 66. It should be noted that in position N (position of FIG. 2), no working hydraulic fluid from within hydraulic fluid path 319 is supplied to either of forward movement clutch 65 or reverse movement brake 66, so the engagement thereof is released and drive is not transmitted from the engine (drive transmission is cut off).

Lock-up shift valve 190 comprises a spool 191 that is capable of movement in the left and right directions within the housing and a spring 192 that constantly biases spool 191 in the rightwards direction, being provided on the left-hand side of this spool 191. On the right-hand side of spool 191, there is provided a hydraulic fluid chamber 193 that is communicated with hydraulic fluid path 322 that communicates with clutch shift valve 170; thus biasing force can be applied in the leftwards direction to spool 191 by operation of first signal pressure or second signal pressure. Hereinbelow, the position (position on the right-hand side) of spool 191 in a condition in which neither the first signal pressure nor the second signal pressure acts on hydraulic fluid chamber 193 is turned the lock-up mechanism non-actuated position; the position (position on the left-hand side) of spool 191 in the condition in which one or other of the first signal pressure or second signal pressure acts on hydraulic fluid chamber 193 is termed the lock-up mechanism actuated position.

Lock-up control valve 200 comprises a spool 201 that is capable of left and right movement within the housing, and a spring 202 provided on the left-hand side of this spool 201 and that constantly biases spool 201 in the right-hand direction. Biasing force in the left-hand direction is applied to spool 201 by the action of the control pressure (control pressure generated by pressure adjustment by the linear solenoid valve 140) mentioned above that is supplied through hydraulic fluid paths 313, 323 to hydraulic chamber 203 provided on the right-hand side of spool 201. Engagement control pressure of lock-up mechanism 50 is supplied into hydraulic fluid path 325 by pressure regulation of the excess hydraulic fluid from regulator valve 110 that is supplied through hydraulic fluid paths 303, 324 by means of this lock-up control valve 200; this engagement control pressure is a pressure dependent on the position of spool 201; thus, this can be effected by control of the magnitude of the control pressure from a linear solenoid valve 140 that performs position control of this spool 201 i.e. by control of the drive amount of spool 141 of linear solenoid valve 140, performed from the electrical control unit.

At this point when (1) the first solenoid valve 150 is OFF and the second solenoid valve 160 is OFF, no signal pressure acts on either of the two hydraulic chambers 173,174, so spool 171 of this valve 170 is positioned on the left-hand side as described above. At this point, branch hydraulic path 326 of hydraulic path 313 is in communication with hydraulic path 319 communicated to manual valve 180, so control pressure generated by pressure adjustment by linear solenoid valve 140 is supplied to forwards movement clutch 65 and reverse movement brake 66 (hereinbelow, these will be termed "frictional engagement elements"). Control (control to optimize the engagement capacity) of the engagement capacity of the frictional engagement elements can therefore be performed by means of linear solenoid valve 140 from the electrical control unit.

Also, although at this point clutch shift valve 170 puts the branch hydraulic path 327 of hydraulic path 316 in communication with hydraulic path 322, since second solenoid valve 160 is OFF, the second signal pressure is not output, so the spool 191 of lock-up shift valve 190 is biased by spring 192 into the right-hand position (it is positioned in the non-actuated position of the lock-up mechanism). Branch hydraulic path 328 of hydraulic path 303 is then in communication with hydraulic path 329 that is communicated with the cover side hydraulic chamber 53 of lock-up mechanism 50, so hydraulic path 330 that is communicated to the turbine side hydraulic chamber 52 of lock-up mechanism 50 is in communication with hydraulic path 331. Consequently, the excess hydraulic fluid from regulator valve 110 is supplied from hydraulic paths 303, 328, 329 to cover side hydraulic chamber 53, and the working hydraulic fluid in torque converter 30 is discharged from hydraulic paths 330, 331 or from hydraulic paths 332 333 or hydraulic paths 332, 334 to an oil cooler.

By such a flow of working hydraulic fluid, the pressure in cover side hydraulic chamber 53 becomes higher than the pressure in turbine side hydraulic chamber 52, giving rise to a pressure difference between the two hydraulic chambers 52 and 53, as a result of which lock-up clutch piston 51 is biased towards turbine runner 32. Lock-up clutch piston 51 therefore does not engage converter cover 34, and the lock-up mechanism 50 is put in non-actuated condition. It should be noted that, in this condition, crankshaft Es and input shaft 20 are not coupled (or their coupling is released). Also, since first solenoid valve 150 is then OFF, the first signal pressure does not act on hydraulic chamber 117 of regulator valve 110 and the spool 111 is positioned in the position corresponding to high pressure on the left-hand side, so line pressure in hydraulic path 302 is set to high-pressure line pressure.

Also (2), when the first solenoid valve 150 is ON, and the second solenoid valve 160 is OFF, the first signal pressure acts on hydraulic chamber 173 of clutch shift valve 170 and the second signal pressure does not act on hydraulic chamber 174, so spool 171 is positioned on the right-hand side. At this point, branch hydraulic path 335 of hydraulic path 309, which is a flow path of a secondary pressure obtained by reducing the line pressure (this is equal to the first side-pressure supplied to the driven cylinder 78) by means of reducing valve 129, is in communication with hydraulic path 319 which is communicated to manual valve 180, so secondary pressure of the line pressure (first side-pressure) is supplied to the frictional engagement element, which is thereby maintained in a fully engaged condition.

Also, since at this point clutch shift valve 170 puts the branch hydraulic path 336 of hydraulic path 306 in communication with hydraulic path 322, the first signal pressure that is output from first solenoid valve 150 acts on hydraulic chamber 193 of lock-up shift of valve 190, causing spool 191 of this valve 190 to be positioned on the left-hand side (to be positioned in the actuated position of the lock-up mechanism). At this point, hydraulic path 328 is in communication with hydraulic path 330, and hydraulic path 325 is in communication with hydraulic path 329, so excess hydraulic fluid from regulator valve 110 is supplied from hydraulic paths 303, 324, 325, 329 to cover side hydraulic chamber 53, and also from hydraulic paths 303, 328, 330 to turbine side hydraulic chamber 52; in addition, working hydraulic fluid in torque converter 30 is discharged into an oil cooler through hydraulic paths 332, 333 or hydraulic paths 332, 334.

Thus, working hydraulic fluid is supplied simultaneously by different parts to the two hydraulic chambers 52 and 53, but the working hydraulic fluid pressure (torque converter back pressure) that is supplied to cover side hydraulic chamber 53 is the engagement control pressure that is generated by pressure adjustment performed in lock-up control valve 200 and is lower than the working hydraulic fluid pressure (internal pressure of the torque converter) that is supplied directly to turbine side hydraulic chamber 52 from regulator valve 110, so a pressure difference is created between the two hydraulic chambers 52 and 53, causing lock-up clutch piston 51 to be biased towards converter cover 34. As a result, lock-up clutch piston 51 engages with converter cover 34 and lock-up mechanism 50 is put into actuated condition. It should be noted that, in this condition, clutch shaft Es and input shaft 20 are in coupled condition.

Thus, since, as described above, the engagement control pressure that is supplied to cover side hydraulic chamber 53 is capable of being controlled by a control pressure generated by pressure adjustment performed by linear solenoid valve 140, engagement control (control to achieve optimum engagement capacity) of lock-up mechanism 50 can be performed through linear solenoid valve 140 from the electrical control unit. Specifically, the amount of leftward movement of spool 201 of lock-up control valve 200 becomes larger as the control pressure is increased and the pressure of the working hydraulic fluid that is supplied to the cover side hydraulic chamber 53 becomes correspondingly lower, so the engagement capacity (engagement capacity of lock-up clutch piston 51 and converter cover 34) of lock-up mechanism 50 can be made larger.

It should be noted that, in this case (2), first solenoid valve 150 is ON, so the first signal pressure acts on the hydraulic chamber 117 of regulator valve 110, positioning spool 111 in the position on the right-hand side corresponding to low pressure, with the result that the line pressure of hydraulic path 302 is set to low-pressure line pressure. The secondary pressure obtained by reducing in pressure this low-pressure line pressure is supplied to the frictional engagement elements as described above and this is used to achieve full engagement, so it is necessary that the magnitude of the secondary pressure of this low-pressure line pressure should be maintained at a desired value satisfying this condition and it is also necessary that it should have a pressure sufficient to perform smooth ordinary gear-change operation (actuation of pulleys 71 and 75) during steady (high-speed) running.

Also, in case (3), in which first solenoid valve 150 is ON and second solenoid valve 160 is also ON, the first signal pressure acts on hydraulic chamber 173 of clutch shift valve 170 and the second signal pressure acts on hydraulic chamber 174, so the spool 171 of this valve 170 is positioned on the left-hand side. In the same way as in the case (1) described above, branch hydraulic path 326 of hydraulic path 313 is in communication with hydraulic path 319 communicated to manual valve 180, and the control pressure generated by pressure adjustment by linear solenoid valve 140 is supplied to the frictional engagement element, so engagement control of the frictional engagement element can be performed through the linear solenoid valve 140 from the electrical control unit.

Also, at this point, clutch shift valve 170 puts branch hydraulic path 327 of hydraulic path 316 in communication with hydraulic path 322, so the second signal pressure that is output from second solenoid valve 160 acts on hydraulic chamber 193 of lock-up shift valve 190, causing the spool 191 of this valve 190 to be positioned on the left-hand side (positioned in the actuated position of the lock-up mechanism). Consequently, just as in case (2) described above, the engagement control pressure supplied to cover side hydraulic chamber 53 can be controlled by control pressure obtained by pressure adjustment by linear solenoid valve 140, so engagement control of lock-up mechanism 50 can also be performed from the electrical control unit through linear solenoid valve 140 (using the same control pressure). Also, since first solenoid valve 150 is ON, the first signal pressure acts on hydraulic chamber 117 of regulator valve 110 and, just as in case (2), the line pressure within hydraulic path 302 is set to low-pressure line pressure.

Furthermore, in case (4), when first solenoid valve 150 is OFF and second solenoid valve 160 is ON, the first signal pressure does not act on hydraulic chamber 173 of clutch shift valve 170, but, since the second signal pressure acts on hydraulic chamber 174, spool 171 is positioned on the left. In this way, just as in the case of (1) or (3), branch hydraulic path 326 of hydraulic path 313 is in communication with hydraulic path 319 that is communicated with manual valve 180, so control pressure generated by pressure adjustment by linear solenoid valve 140 is supplied to the frictional engagement element, with the result that engagement control of the frictional engagement element can be performed through linear solenoid valve 140 from the electrical control unit.

Also, at this point, clutch shift valve 170 puts branch hydraulic path 327 of hydraulic path 316 in communication with hydraulic path 322, so the second signal pressure that is output from second solenoid valve 160 acts on hydraulic chamber 193 of lock-up shift valve 190, causing the spool 191 of this valve 190 to be positioned on the left (positioned in the actuated position of the lock-up mechanism). Consequently, just as in the case of (2) or (3) above, the engagement control pressure that is supplied to cover side hydraulic chamber 53 is controllable by means of the control pressure that is generated by pressure adjustment by linear solenoid valve 140 and, just as in case (3), engagement control of the lock-up mechanism 50 can also be performed through linear solenoid valve 140 (using the same control pressure) from the electrical control unit. However, unlike the case (3), in this case, first solenoid valve 150 is OFF, so the first signal pressure does not act on hydraulic chamber 117 of regulator valve 110 and the line pressure within hydraulic path 302 is thus set to high-pressure line pressure in the same way as in case (1).

The above description is shown in summarized fashion in the Table shown in FIG. 5. As shown in this Table, just as in the case of (1) above, by setting both of the first solenoid valve 150 and the second solenoid valve 160 to OFF from the electrical control unit, lock-up mechanism 50 is put in non-engaged (non-actuated) condition, so that engagement control cannot be performed, but engagement control of the frictional engagement element can be performed through linear solenoid valve 140 from the electrical control unit. High-pressure line pressure is then set as the line pressure (the supply capacity of working hydraulic fluid that is set by this high-pressure line pressure corresponds to large capacity in the second embodiment, to be described), so such setting is performed in a case where, when for example the position of the manual shift lever is changed from N to D (or from N to R) prior to move-off of the vehicle, it is necessary to decrease the shock on engagement by gradually engaging the frictional engagement element which is currently in a non-engaged condition, or in a running region in which the load for example after move-off of the vehicle is large and the output number of revolutions (vehicle speed) is small, yet high-pressure working hydraulic fluid is necessary for operation of the transmission CVT without lock-up due to increased torque production by the torque converter 30.

Also, as in (2) above, although the frictional engagement element is put in a fully engaged condition by setting the first solenoid valve 150 to ON and second solenoid valve 160 to OFF from the electrical control unit, its engagement capacity can be varied in accordance with the first side-pressure (line pressure) supplied to driven cylinder 78 as described above, making it possible to control the transmission torque capacity in accordance with running condition. Furthermore, the lock-up mechanism 50 is put into actuated condition and engagement control thereof can be achieved through linear solenoid valve 140 from the electrical control unit. Under these conditions, low-pressure line pressure is set for the line pressure (the supply capacity of working hydraulic fluid that is set at this low-pressure line pressure corresponds to large capacity in the second embodiment, to be described), so such setting is performed for example in a running region such as during low-speed running in which, although the load is comparatively small and the number of output revolutions is quite large so the frictional engagement element could remain fully engaged, it is necessary to change the engagement capacity of the lock-up mechanism 50 from zero to a value matching the engine torque and furthermore high-pressure is required for operation of the transmission CVT.

Also, as in case (3), by setting both the first solenoid valve 150 and the second solenoid valve 160 ON from the electrical control unit, both engagement control of lock-up mechanism 50 and engagement control of the frictional engagement element can be performed using the same control value (control pressure generated by pressure adjustment by linear solenoid valve 140) from the electrical control unit. In this case also, just as in the case of (2), low-pressure line pressure is set as the line pressure, so such setting is performed for example in a running region such as for example steady (high-speed) running, in which the load is small and the number of output revolutions is large, and the engagement capacity of the lock-up mechanism 50 changes in correspondence with engine torque; whereas the engagement capacity of the frictional engagement element must change with the same change as change of the engagement capacity of lock-up mechanism 50 yet high pressure for operation of the transmission CVT is not required. However, for the same control pressure, it is desirable that the engagement capacity of the lock-up mechanism 50<the engagement capacity of the frictional engagement element.

Furthermore, in a case as in (4) above, by setting first solenoid valve 150 to OFF and second solenoid valve 160 to ON from the electrical control unit, just as in the case of (3) above, both engagement control of the lock-up mechanism 50 and engagement control of the frictional engagement element can be performed using the same control value (control pressure generated by pressure adjustment by linear solenoid valve 140) from the electrical control unit. However, the difference from the case of (3) is that, since high-pressure line pressure is set for the line pressure, such setting is performed in for example the case of abrupt deceleration from steady running i.e. the case where the gear ratio must be rapidly returned to the LOW side by rapidly actuating the two pulleys 71 and 75 using working hydraulic fluid supplied with high pressure and large volume (in particular, when the vehicle is stopped after abrupt deceleration).

Thus, with a belt-type continuously variable transmission CVT according to the present invention, although, in case (2) above, the frictional engagement element is maintained in full engagement, for the working hydraulic fluid pressure, the first side-pressure that determines the transmission torque capacity of the continuously variable transmission 70 i.e. the torque that can be transmitted between the two pulleys 71 and 75 without giving rise to slippage at belt 79 is employed, so the transmission torque capacity of the frictional engagement element changes with the transmission torque capacity of the continuously variable transmission mechanism 70. Consequently, if the transmission torque capacity of the frictional engagement element is set as required such that it is somewhat lower than the transmission torque capacity of the continuously variable transmission mechanism 70, even if a torque exceeding the transmission torque capacity of the continuously variable transmission mechanism 70 is input to this belt-type continuously variable transmission CVT, slippage of the frictional engagement element can be made to take place before belt slippage occurs in the continuously variable transmission mechanism 70, thereby making it possible to prevent damage to belt 79 due to slippage. Also, with this construction, control of the engagement capacity of the frictional engagement element can be performed without needing an expensive linear solenoid valve; thus manufacturing costs can be considerably reduced compared with the case where a linear solenoid valve is employed, and this is superior to the linear solenoid valve in terms of reliability in regard to belt slippage, thereby improving safety. It should be noted that, for the above required setting, apart from effecting supply to the frictional engagement element after reducing the first side-pressure as described above, it would be possible to adjust the number of frictional plates constituting the frictional engagement element or the coefficient of friction thereof.

Figure 6:
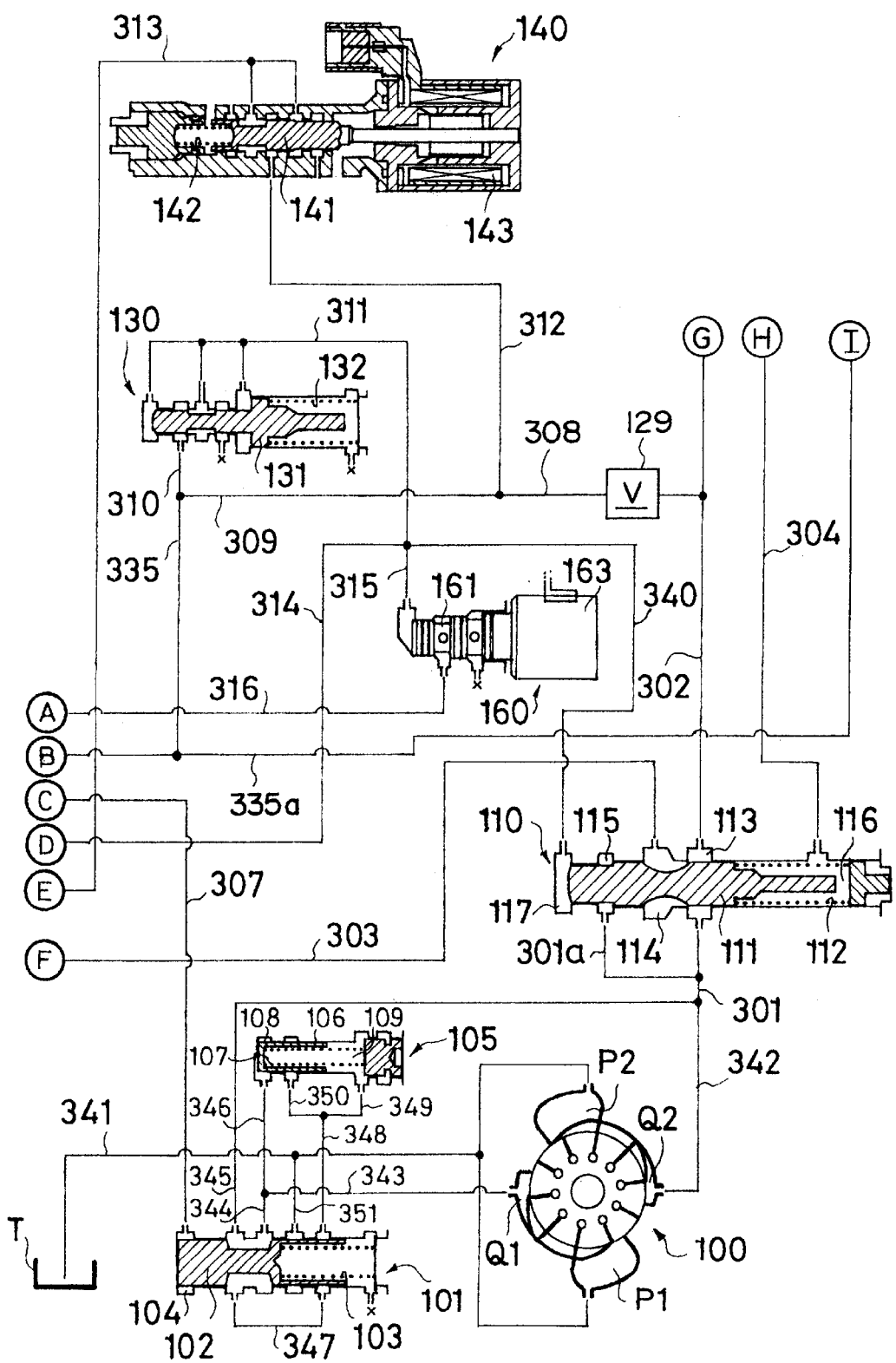
FIG. 6 is a hydraulic circuit diagram illustrating the construction of a vehicle drive transmission device to which a belt-type continuously variable transmission according to the present invention has been applied, and relates to a second embodiment thereof.

Next, a second embodiment of a belt-type continuously variable transmission mechanism according to the present invention is illustrated. The subject in respect of which this belt-type continuously variable transmission is employed is the same as the vehicle drive transmission device described above, so the description concerning FIG. 1 is omitted. FIG. 2, FIG. 4 and FIG. 6 are hydraulic circuit diagrams illustrating the construction of this drive transmission device (the construction relating to FIG. 2 and FIG. 4 is the same as in the case of the drive transmission device described above, so the description thereof is incorporated herein by reference). In both drawings, the letters A to F and the letters G to I surrounded by circles indicate hydraulic paths that are mutually connected.

The construction of the drive transmission device illustrated in this second embodiment has many features in common with the drive transmission device according to the first embodiment described above. However, it has three differences: (1) hydraulic pump 100 is a vane pump having respectively two inlet and outlet ports and the discharge capacity of hydraulic pump 100 is made variable by providing a discharge capacity changeover valve 101 and check valve 105 (hereinbelow, hydraulic pump 100, discharge capacity changeover valve 101, check valve 105 and the hydraulic paths relating to these are referred to together as the working hydraulic fluid supply device); (2) the hydraulic path 307 constituting the flow path of the first signal pressure that is output from first solenoid valve 150 is connected, not to hydraulic chamber 117 of regulator valve 110, but to hydraulic chamber 104 of the above discharge capacity changeover valve 101; and (3) modulator pressure obtained by pressure adjustment by a modulator valve 130 is supplied through branch hydraulic path 340 of hydraulic path 311 to hydraulic chamber 117 of regulator valve 110, thereby supplying biasing force in the rightwards direction to spool 111.

First of all, the working hydraulic fluid supply device will be described. As shown in FIG. 6, the hydraulic pump 100 that is comprised in this working hydraulic fluid supply device is provided with first and second inlet ports P1 and P2 and first and second discharge ports Q1 and Q2; first inlet port P1 and second inlet port P2 are each connected to hydraulic fluid tank T through hydraulic path 341 and second discharge port Q2 is connected to hydraulic path 301 described above that is communicated with regulator valve 110 through hydraulic path 342.

Discharge capacity changeover valve 101 is constructed comprising a spool 102 that is capable of movement in the left and right directions within the housing and a spring 103 that constantly biases spool 102 leftwards, being provided to the right of this spool 102. A hydraulic path 307 that is communicated with first solenoid valve 150 as described above is connected to hydraulic chamber 104 provided on the left of spool 102; biasing force is applied to spool 104 by supplying the first signal pressure that is output when first solenoid valve 150 is ON, thereby enabling it to be positioned on the right-hand side. Branch hydraulic path 344 of hydraulic path 343 that is communicated with the first discharge port Q1 of hydraulic pump 100 is connected with this discharge capacity changeover valve 101; when spool 102 is positioned on the left, this hydraulic path 344 communicates with hydraulic path 345 that is communicated with hydraulic path 301, but when spool 102 is positioned on the right, communication of hydraulic path 344 and hydraulic paths 345 is cut off by spool 102.

Check valve 105 comprises a spool 106 that is capable of movement in the left and right directions within the housing and a spring 107 that is provided on the right-hand side of this spool 106 and constantly biases spool 106 leftwards. A branch hydraulic path 346 of hydraulic path 343 is communicated to hydraulic chamber 108 that is provided. on the left of spool 106; the working hydraulic fluid pressure that is discharged from first discharge port Q1 of hydraulic pump 100 constantly acts thereon, supplying a biasing force in the rightwards direction to spool 106 (however, as will be described, this biasing force does not act when first discharge port Q1 is put in communication with the hydraulic fluid tank T).

When first solenoid valve 150 is OFF and the first signal pressure is not acting on hydraulic chamber 104 of discharge capacity changeover valve 101, the spool 102 of this valve 101 is positioned on the left-hand side by the biasing force of spring 103, but since, as described above, hydraulic path 344 and hydraulic path 345 are connected, the working hydraulic fluid discharged from first discharge port Q1 of hydraulic pump 100 merges with the working hydraulic fluid discharged from second discharge port Q2 and is supplied into hydraulic path 301. Hereinbelow, the working hydraulic fluid supply capacity from hydraulic pump 100 when working hydraulic fluid discharged from first discharge port Q1 and the working hydraulic fluid discharged from second hydraulic port Q2 are merged and supplied to hydraulic path 301 in this way is called "large capacity" and the position (position on the left-hand side) of spool 102 under these conditions is called the "position corresponding to large capacity".

Also, although at this point the working hydraulic fluid in hydraulic paths 343, 344 penetrates from hydraulic path 347 to hydraulic path 348, since branch hydraulic path 349 of this hydraulic path 348 is in communication with the spring chamber 109 of the check valve 105, biasing force in the leftwards direction acts on spool 106 of this valve 105. Also, the working hydraulic fluid in hydraulic path 343 likewise acts on hydraulic chamber 108 of check valve 105 through hydraulic path 346, so rightwards biasing force acts on spool 105, but since these left and right biasing forces are mutually equal, spool 106 stays in a condition in which it is biased leftwards by the biasing force of spring 107 (in this condition, hydraulic path 346 and branch hydraulic path 350 of hydraulic path 348 are not in communication).

In contrast, when first solenoid valve 150 is ON and the first signal pressure acts on hydraulic chamber 104 of discharge capacity changeover valve 101, the biasing force in the rightwards direction produced by this first signal pressure overcomes the biasing force in the leftwards direction produced by spring 103, with the result that spool 102 of this valve 101 is positioned on the right-hand side. At this point, communication between hydraulic path 344 and hydraulic path 345 is cut off and hydraulic path 344 is connected with branch hydraulic path 351 of hydraulic path 341 that is communicated with oil tank T, so working hydraulic fluid discharged from first discharge port Q1 of hydraulic pump 100 is returned to oil tank T. The amount of working hydraulic fluid that is supplied into hydraulic path 301 is therefore only the capacity of second discharge port Q2, so the capacity that is supplied into hydraulic path 301 from hydraulic pump 100 is halved compared with the large capacity referred to above. Hereinbelow, the working hydraulic fluid supply capacity from hydraulic pump 100 when only working hydraulic fluid discharged from first discharge port Q1 is thus supplied into hydraulic path 301 will be called "small capacity", and the position (position on the righthand side) of spool 102 under these conditions will be called the "position corresponding to small capacity".

Also, while, at this point, the discharge pressure from first discharge port Q1 acts on spring chamber 109 of check valve 105 through hydraulic paths 343, 344, 347, 348, and 349, only a pressure of about atmospheric pressure acts on hydraulic chamber 108 of this valve 105 (since hydraulic path 343 is in communication with oil tank T) so no rightwards biasing force acts on spool 106 and spool 106 assumes a condition biased in the left-hand direction. Consequently, second discharge port Q2 is also unable to communicate with oil tank T by communication of hydraulic path 346 and hydraulic path 350, so the working hydraulic fluid discharged from second discharge port Q2 is maintained at the required pressure.

It should be noted that, in the transient condition in which spool 102 of discharge capacity changeover valve 101 is changed over to a position on the right-hand side of the position on the left, high pressure is instantaneously generated within hydraulic path 343 on blockage of hydraulic path 344 by spool 102, but this high pressure then acts on hydraulic chamber 108 of check valve 105 from hydraulic path 346, biasing spool 106 of this valve 105 to the right and thereby putting hydraulic path 346 and hydraulic path 350 in communication, so the high pressure generated in hydraulic path 343 is discharged into hydraulic path 301 from hydraulic path 346 and hydraulic paths 350, 348, 347, and 345. The variation of discharge pressure that accompanies the position changeover of discharge capacity changeover valve 101 is therefore suppressed to a small amount, so bursts of the hydraulic paths are also prevented.

In such a construction, just as in case (1) in the first embodiment described above, when the first solenoid valve 150 is OFF and the second solenoid valve 160 is also OFF, spool 171 of clutch shift valve 170 is positioned on the left-hand side, allowing hydraulic path 326 to communicate with hydraulic path 319 that is communicated with manual valve 180, so control pressure generated by pressure adjustment by linear solenoid valve 140 is supplied to the frictional engagement element, making it possible to effect engagement control of the frictional engagement element (control to optimize the engagement capacity thereof) through linear solenoid valve 140 from the electrical control unit; also, since the second signal pressure is not output from the second solenoid valve 160, spool 191 is positioned on the right-hand side of lock-up shift valve 190 (positioned in the non-actuated position of the lock-up mechanism), so, for the reasons explained previously, lock-up mechanism 50 is put in a non-engaged (non-actuated) condition. Also, since first solenoid valve 150 is OFF, the first signal pressure does not act on the hydraulic chamber 104 of the discharge capacity changeover valve 101, and the spool 102 of this valve 101 is positioned in the position corresponding to large capacity, on the left, so that hydraulic pump 100 supplies working hydraulic fluid with large capacity.

Next, just as in case (2) in the first embodiment, when first solenoid valve 150 is ON and second solenoid valve 160 is OFF, spool 171 of clutch shift valve 170 is positioned on the right-hand side, this allows hydraulic path 335, which is the flow path of a secondary pressure obtained by pressure reduction of the line pressure by reducing valve 129, to communicate with hydraulic path 319, which is communicated with the manual valve 180, causing the fully engaged condition to be held by supply of the secondary pressure of the line pressure (first side-pressure) to the frictional engagement element; also, it allows the first signal pressure that is output from first solenoid valve 150 to act on hydraulic chamber 193 of lock-up shift valve 190, with the result that spool 191 of this valve 190 is positioned on the left (positioned in the actuated position of the lock-up mechanism), so lock-up mechanism 50 is put in actuated condition, making it possible to perform engagement control of lock-up mechanism 50 (control to optimize the engagement capacity thereof) from the electrical control unit through linear solenoid valve 140. Also, since first solenoid valve 150 is then ON, the first signal pressure acts on hydraulic chamber 104 of discharge capacity changeover valve 101, with the result that spool 102 of this valve 101 is positioned in the position corresponding to small capacity, on the right, allowing hydraulic pump 100 to supply working hydraulic fluid with small capacity. It should be noted that it is only necessary to ensure that the capacity of this supply capacity (small capacity) is sufficient to perform ordinary gear-change operation (operation of pulleys 71 and 75) i.e. excluding abrupt deceleration from steady running.

Also, just as in case (3) of the first embodiment, when first solenoid valve 150 is ON and second solenoid valve 160 is also ON, this spool 171 of clutch shift valve 170 is positioned on the left-hand side, allowing hydraulic path 326 to communicate with hydraulic path 319 that is communicated with the manual valve 180 and control pressure generated by pressure regulation performed by solenoid valve 140 to be supplied to the frictional engagement element; engagement control of the frictional engagement element can therefore be performed from the electrical control unit through linear solenoid valve 140 and the second signal voltage that is output from second solenoid valve 160 can act on the hydraulic chamber 193 of lock-up shift valve 190, causing spool 191 of this valve 190 to be positioned on the left (positioned in the actuated position of the lock-up mechanism); thus, the engagement control pressure that is supplied to the cover side hydraulic chamber 53 can be controlled by the control pressure generated by pressure adjustment performed by linear solenoid valve 140, so engagement control of lock-up mechanism 50 can also be performed from the electrical control unit through the linear solenoid valve 140 (using the same control pressure). Also, since the first solenoid valve 150 is then ON, the first signal pressure acts on the hydraulic chamber 104 of discharge capacity changeover valve 101, causing spool 102 to be positioned in the position corresponding to small capacity, on the right, and hydraulic pump 100 to supply working hydraulic fluid with small capacity.

Furthermore, just as in case (4) in the first embodiment described above, when first solenoid valve 150 is OFF and second solenoid valve 160 is ON, spool 171 of clutch shift valve 170 is positioned on the left, allowing the hydraulic path 326 to communicate with hydraulic path 319 that is communicated with the manual valve 180 and so allowing control pressure that is generated by pressure adjustment by linear solenoid valve 140 to be supplied to the frictional engagement element; consequently, engagement control of the frictional engagement element can be performed from the electrical control unit and the second signal pressure output from second solenoid valve 160 can act on hydraulic chamber 193 of lock-up shift valve 190, causing spool 191 of this valve 190 to be positioned on the left (positioned in the actuated position of the lock-up mechanism) and the engagement control pressure that is supplied to cover side hydraulic chamber 53 to be controlled by control pressure generated by pressure adjustment by linear solenoid valve 140; engagement control of the lock-up mechanism 50 can therefore be performed from the electrical control unit through solenoid valve 140. That is, in contrast to the case (3), first solenoid valve 150 is OFF, so the first signal pressure does not act on hydraulic chamber 104 of discharge capacity changeover valve 101; consequentially, just as in case (1) in which spool 102 is positioned in the left-hand position, corresponding to large capacity, hydraulic pump 100 supplies working hydraulic fluid with large capacity.

The above description is summarized in the Table shown in FIG. 7. As also shown in this Table, as in case (1), by setting both of the first solenoid valve 150 and the second solenoid valve 160 to OFF from the electrical control unit, lock-up mechanism 50 is put in a non-engaged (non-actuated) condition in which engagement control thereof cannot be performed; however, engagement control of the frictional engagement element is possible through linear solenoid valve 140 from the electrical control unit. At this point, hydraulic pump 100 is set so as to supply working hydraulic fluid with large capacity (it should be noted that the hydraulic fluid pressure of this working hydraulic fluid corresponds to high line pressure in the first embodiment described above), so such setting is performed for example when, before moving-off of the vehicle, the position of the manual shift lever is shifted from N to D (or from N to R) etc and the shock occurring on engagement must be reduced by effecting the engagement of the frictional engagement element which was previously in an non-engaged condition in a gradual manner, or in running regions where, for example after move-off of the vehicle, the load is large and the number of output revolutions (vehicle speed) is small and large-capacity supply of working hydraulic fluid to the transmission CVT is required without producing lock-up by increasing the torque produced by torque converter 30.

Also, as in case (2) above, the frictional engagement element is put in fully engaged condition by performing setting from the electrical control unit such as to put the first solenoid valve 150 into an ON condition and the second solenoid valve 160 into an OFF condition, but, as described above, control of the transmission torque capacity in response to running condition can be achieved by varying the engagement capacity in accordance with the first side-pressure (line pressure) that is supplied to cylinder 78 of the driven pulley 75. Furthermore, lock-up mechanism 50 is put in actuated condition and engagement control thereof can be performed from the electrical control unit by means of linear solenoid valve 140. Under these conditions, hydraulic pump 100 is set so as to supply working hydraulic fluid with small capacity (the hydraulic fluid pressure of this working hydraulic fluid corresponds to high line pressure in the first embodiment described above), so such setting may be performed for example as in low-speed running where the load is comparatively small and the number of output revolutions is moderately large, with the frictional engagement element left in a fully engaged condition, and in an operating region where the engagement capacity of the lock-up mechanism 50 needs to be changed from zero to a value matching the engine torque, yet large-capacity supply of working hydraulic fluid for operating the transmission CVT is not needed.

Also, as in case (3) above, by using the electrical control unit to set both of the first solenoid valve 150 and second solenoid valve 160, it is possible to achieve both engagement control of the lock-up mechanism 50 and engagement control of the frictional engagement element from the electrical control unit using the same control value (control pressure generated by pressure adjustment performed by linear solenoid valve 140). Just as in case (2), hydraulic pump 100 is set so as to supply working hydraulic fluid with small capacity, so such setting is performed for example as in steady (high-speed) running, in a running region where the load is small and the number of output revolutions is large so that the engagement capacity of lock-up mechanism 50 changes considerably with engine torque; and where the engagement capacity of the frictional engagement element needs to be changed with the same change as the change of engagement capacity of lock-up mechanism 50, yet large capacity supply of working hydraulic fluid for operation of the transmission CVT is not needed (preferably, for the same control pressure, the engagement capacity of lock-up mechanism 50<the engagement capacity of the frictional engagement element).

Furthermore, as in case (4) above, by using the electrical control unit to set the first solenoid valve 150 to OFF and the second solenoid valve 160 to ON, just as in case (3) above, it is possible for the electrical control unit to perform both engagement control of lock-up mechanism 50 and engagement control of the frictional engagement element using the same control value (control pressure generated by pressure adjustment performed by solenoid valve 140). However, in contrast to case (3), since hydraulic pump 100 is set so as to supply working hydraulic fluid with large capacity, such setting is performed for example in the case of abrupt deceleration from steady running i.e. in the case where both pulleys 71 and 75 are abruptly actuated using high-pressure, large-capacity supply of working hydraulic fluid, so as to return the gear ratio rapidly to the LOW side (in particular in the case of stopping the vehicle after rapid deceleration) etc.

In case (2) in this second embodiment also, the frictional engagement element is held in fully engaged condition, but, as the working hydraulic fluid pressure, the first side-pressure that determines the transmission torque capacity of the continuously variable transmission 70 i.e. the torque that is capable of being transmitted between the two pulleys 71 and 75 without producing slippage of belt 79 is employed, and the transmission torque capacity of the frictional engagement element is made to change together with the transmission torque capacity of the continuously variable transmission mechanism 70. The same benefits as in case (2) in the first embodiment can therefore be obtained.

While embodiments of a belt-type continuously variable transmission according to the present invention have been described above, the scope of the present invention is not restricted to the scope of these. For example, the frictional engagement element (i.e. the element that effects disconnection of the drive between the engine and the output shaft) that prevents damage to the belt by slipping before the belt slips is not restricted to the forwards movement clutch 65 and reverse movement brake 66 constituting the forwards/reverse movement changeover mechanism 60 as in the foregoing embodiments and the same benefits as in the above embodiments can be obtained by providing an element such as a moving-off clutch between the engine and the output shaft, this moving-off clutch or the like being made to play the role of the frictional engagement element referred to in the present invention. Also, in the foregoing embodiments, examples were described in which the present invention was applied to a drive transmission device of a vehicle, but the present invention is not restricted to use in a vehicle and could be applied to other machines or devices.

It should be noted that, while, according to the present invention, the first side-pressure that determines the transmission torque capacity of the continuously variable transmission mechanism may be supplied to the frictional engagement element, it does not matter whether this first side-pressure is supplied to the drive cylinder or is supplied to the driven cylinder. In the second embodiment described above, a construction was adopted wherein the pressure supplied to the driven cylinder 78 was always the first side-pressure; however, as is seen in other belt-type continuously variable transmissions, in the case of an gear-change construction or the like wherein the pressure-receiving area of the drive cylinder and the pressure receiving area of the driven pulley are the same, and the line pressure is employed as the second side-pressure and a pressure obtained by reducing the pressure of the line pressure is employed as the first side-pressure, and these first and second side-pressures are supplied to the two cylinders separately, the benefits of the present invention can be obtained so long as the first side-pressure is always supplied to the frictional engagement element, irrespective of whether it is supplied to the drive cylinder or is supplied to the driven cylinder.

As described above, in a belt-type continuously variable transmission according to the present invention, the first side-pressure that determines the transmission torque capacity of the continuously variable transmission mechanism i.e. the torque that can be transmitted between the two pulleys without giving rise to slippage of the belt is employed as the working hydraulic fluid pressure of the frictional engagement element, so that the transmission torque capacity of the frictional engagement element changes with the transmission torque capacity of the continuously variable transmission. Consequently, if the transmission torque capacity of the frictional engagement element is set as required so as to be somewhat lower than the transmission torque capacity of the continuously variable transmission (for example, by supplying the first side-pressure to the frictional engagement element after reducing its pressure or adjusting the number of frictional plates constituting the frictional engagement element or adjusting the coefficient of friction thereof), even if a torque exceeding the transmission torque capacity of the continuously variable transmission is input to this belt-type continuously variable transmission, slippage can be induced in the frictional engagement element before slippage of the belt of the continuously variable transmission mechanism occurs, thereby making it possible to prevent damage to the belt caused by slipping. Also, with this construction, engagement capacity control of the frictional engagement element is performed without requiring an expensive linear solenoid valve, so manufacturing costs can be considerably reduced compared with the case where a linear solenoid valve is employed, and in regard to reliability with respect to belt slippage it is superior to a construction using a linear solenoid valve and is also of improved safety.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2000-086617 filed on Mar. 27, 2000, which is incorporated herein by reference.

What is claimed is:

1. Belt-driven continuously variable transmission comprising:
   a continuously variable transmission mechanism having a belt that passes over a drive pulley connected with an input shaft for receiving power from a motor and a driven pulley connected with an output shaft, and in which gear-change action is performed by receiving supply of working hydraulic fluid to a drive cylinder for pulley width setting of said drive pulley and a driven cylinder for pulley width setting of said driven pulley;
   a frictional engagement element provided between said motor and said drive pulley or between said driven pulley and said output shaft and that is capable of transmission control of the power from said motor with an engagement capacity responsive to the working hydraulic fluid pressure that is supplied; and
   side-pressure supply means that supply a first side-pressure by which the transmission torque capacity of said continuously variable transmission mechanism is determined to one of said two cylinders and that supply a second side-pressure by which said gear-change action of said continuously variable transmission mechanism is performed to the other of said two cylinders;
   wherein said first side-pressure is supplied to said frictional engagement element as said working hydraulic fluid pressure.

2. The belt-type continuously variable transmission of claim 1, constructed such that the engagement capacity of said frictional engagement element that receives working hydraulic fluid pressure of said first side-pressure is smaller than the transmission torque capacity of said continuously variable transmission mechanism that receives said first side-pressure.

3. The belt-type continuously variable transmission of claim 1,
   wherein said drive pulley comprises a drive fixed pulley half fixed to said input shaft, a drive moveable pulley half provided in opposition to said drive fixed pulley half so as to be freely moveable by sliding in the axial direction, and wherein the drive cylinder provides sliding force in the axial direction to this drive moveable pulley half, and is constructed such that the drive pulley width between said drive fixed pulley half and said drive moveable pulley half is variably set by supplying said first or second side-pressure into said drive cylinder;
   wherein said driven pulley comprises a driven fixed pulley half fixed to said output shaft, a driven moveable pulley half provided in opposition to said driven fixed pulley half so as to be freely moveable by sliding in the axial direction, and wherein the driven cylinder provides sliding force in the axial direction to this driven moveable pulley half, and is constructed such that the driven pulley width between said driven fixed pulley half and said driven moveable pulley half is variably set by supplying said first or second side-pressure into said driven cylinder; and
   wherein the gear ratio is changed in continuous fashion by changing the radius with which said belt is passed over, by adjusting said drive and said driven pulley widths.

4. The belt-type continuously variable transmission of claim 3, wherein said first side-pressure is set to a pressure at which the torque from said motor can be transmitted to said drive and said driven pulleys without slippage of said belt.

5. The belt-type continuously variable transmission of claim 4, wherein, said second side-pressure is set such that, in a condition with said first side-pressure supplied to one of said drive and said driven pulleys, said gear-change action can be performed by supply of said second side-pressure to the other of said drive and said driven pulleys.

* * * * *